Feb. 4, 1941.    J. M. HALL    2,230,944
CONCENTRATING AND DEHYDRATING APPARATUS
Filed April 14, 1938    2 Sheets-Sheet 1

Inventor:
Joseph M. Hall
By Mann, Brown & Co
Attys.

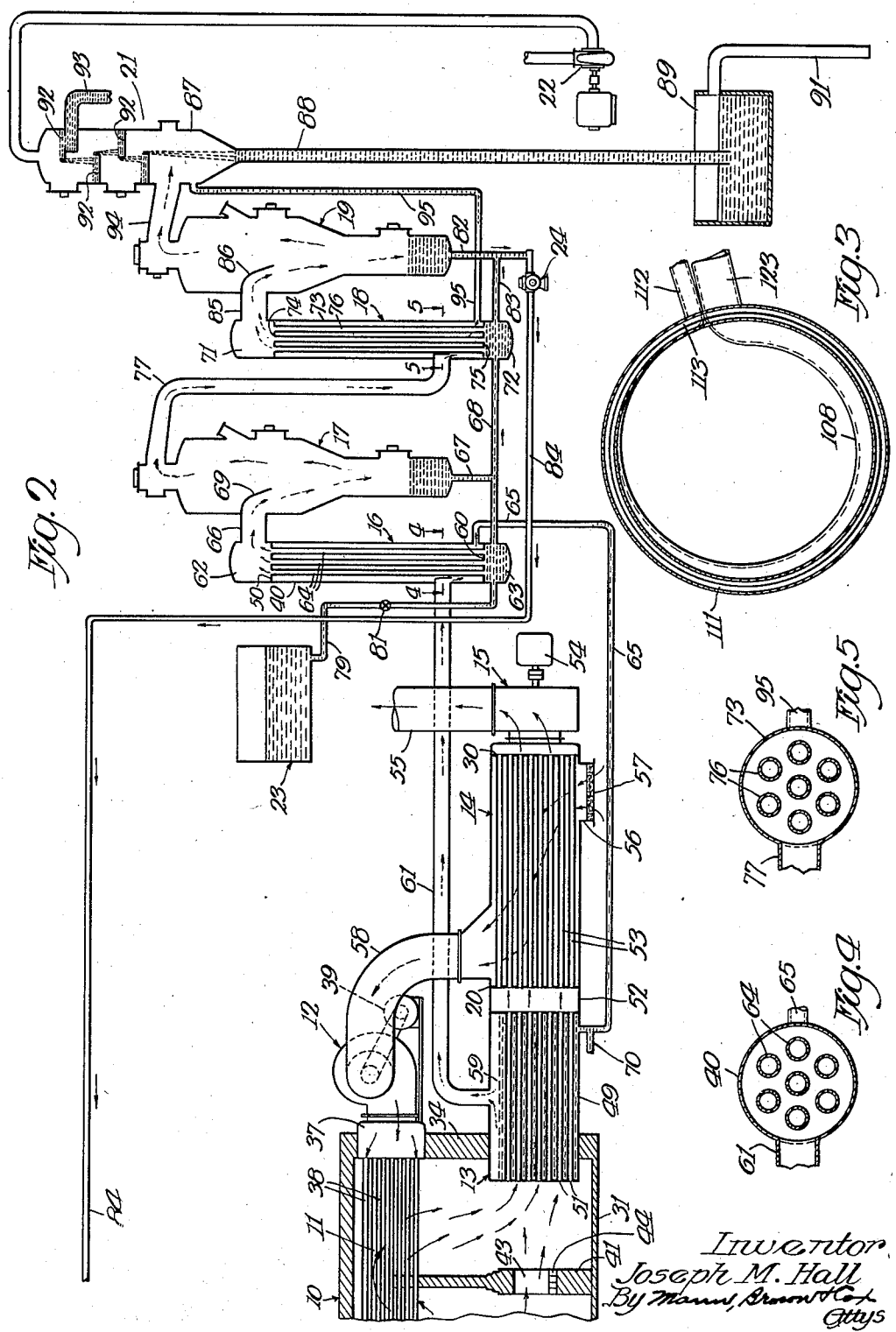

Patented Feb. 4, 1941

2,230,944

UNITED STATES PATENT OFFICE 2,230,944

CONCENTRATING AND DEHYDRATING APPARATUS

Joseph M. Hall, Chicago, Ill.

Application April 14, 1938, Serial No. 201,979

4 Claims. (Cl. 159—4)

This invention relates to systems for evaporating and dehydrating liquid products, and the like.

One of the objects of the invention is the provision of a new and improved dehydrating system employing both air and vapor or steam as the heating media.

Another object of the invention is the provision of a new and improved apparatus for evaporating or concentrating a liquid product by the use of mechanism so constructed that the vapor extracted from the product at one stage of its treatment may be utilized for evaporating additional moisture from the concentrate at another stage of its treatment.

A further object of the invention is the provision of a new and improved apparatus for utilizing steam and reusing the fluid as a heating medium for evaporating a liquid product.

A still further object of the invention is the provision of a new and improved apparatus for utilizing steam for evaporating a portion of the moisture from a liquid product and desiccating the concentrated product by means of heated air applied to the atomized product in a suitable chamber.

Another object of the invention is the provision of a new and improved method for evaporating and dehydrating a liquid product.

A further object of the invention is the provision of a new and improved apparatus for concentrating, dehydrating and collecting liquid products, that is simple in construction and that utilizes a minimum of heat in its operation.

Other and further objects and advantages will appear from the following description taken in connection with the accompanying drawings, in which—

Figs. 1 and 2 are together a side elevation of the apparatus, with parts broken away and parts in section, and showing the entire apparatus diagrammatically;

Fig. 3 is a section on the line 3—3 of Fig. 1;

Figures 1, 6:
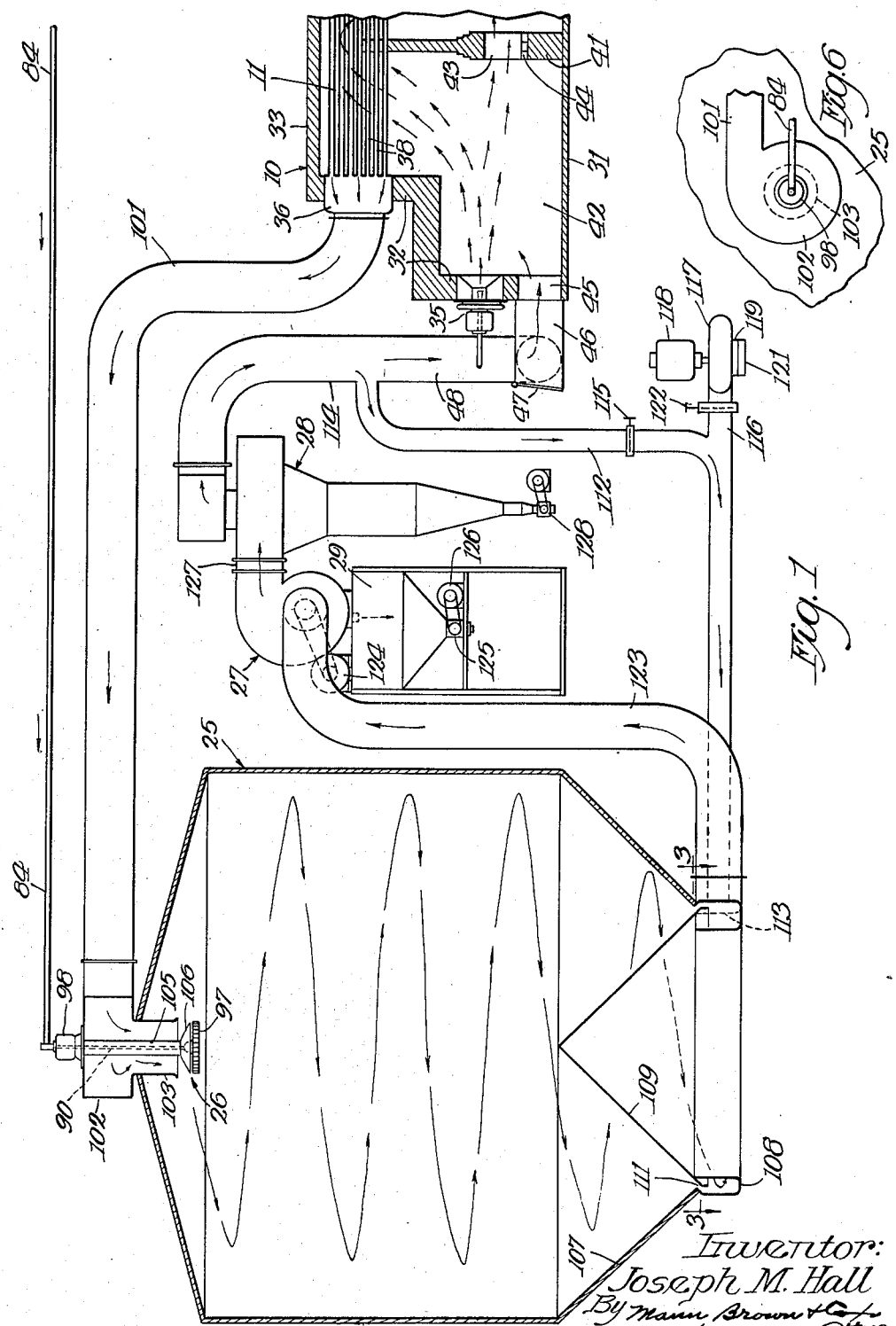

Figs. 4 and 5 are sections on the lines 4—4 and 5—5 of Fig. 2; and

Fig. 6 is a top plan view of the distributor mechanism.

In concentrating and dehydrating liquid food products such as milk and the like, it is necessary to frequently clean and sterilize the equipment if sanitary conditions are to be maintained. It is a matter of common knowledge that bacteria thrive under warm temperature conditions and especially in milk and like products and consequently these precautions are necessary in order to prevent unsanitary conditions. It is evident therefore that any system or apparatus that will reduce the time and labor necessary for cleaning the equipment is highly desirable.

It is common practice to concentrate the liquid product preparatory to desiccating the same. Heated air is the medium frequently employed for this purpose, but since air has a low heat capacity, an extended surface and air in large volume at high velocity is necessary. On the other hand, since steam has a high heat capacity due to the large amount of latent heat contained therein, the heating surface may be materially reduced thereby effecting a material saving in time and expense in cleaning the equipment.

The present invention employs steam as the heating medium and provision is made for recirculating this fluid so as to conserve the heat. The apparatus has its boiler or evaporating surface greatly reduced over that necessary for the use of gases as a heating medium and that without reducing the output of the apparatus.

The apparatus is shown more or less diagrammatically and comprises a furnace 10 having the air heater 11 therein, the blower or fan 12 for directing air through the heater; the boiler 13 for generating steam as a heating medium; the preheater 14 for preheating the air supplied to the dehydrator; exhaust blower 15; the main evaporator 16 and first liquid collector 17; the auxiliary evaporator 18 and second liquid collector 19; the condenser 21, exhaust pump 22; liquid reservoir 23; liquid pump 24; dehydrator 25; distributor mechanism 26; separator 27; collector 28; and, receptacle 29 for receiving desiccated material.

The entire apparatus may be regarded as comprising the furnace mechanism which comprises the furnace proper and the mechanism associated therewith for imparting heat to the heating media used; the concentrating mechanism which comprises the evaporators and attendant liquid collectors and condensing mechanism; the dehydrator which also includes the distributor mechanism; and, the separating and collecting mechanism.

The furnace 10 comprises the bottom wall 31, the front wall 32, the top wall 33 and the rear wall 34. A suitable oil or gas burner 35 is mounted in the front wall 32 as shown more clearly in Fig. 1 of the drawings. Mounted in the upper portion of the furnace is the air heater 11 which comprises a header 36 secured in the front wall 32 and a header 37 secured in the back wall 34. The headers are connected by tubes 38 through which air is caused to pass by the fan or blower 12 operated by a motor 39.

The furnace is provided with a baffle wall 41 which extends upwardly to the heater 12 and forms with the front wall what may be termed a combustion chamber 42. The baffle wall 41 is provided with an opening 43 through which a portion of the heated gas in the combustion chamber may pass, the remainder passing upward around the tubes 38 and over the baffle wall 41 for heating the air passing through the tubes. The amount of air directed over the baffle wall may be controlled by reducing the size of the opening 43 by placing fire bricks 44 therein as desired.

The front wall 32 is provided with an opening 45 around which is secured a chamber 46 having a door 47 therefor which may be opened for having access to the interior of the furnace. The chamber 46 is provided with an opening in which is secured one end of a conduit 48 for conducting air from the air collector into the combustion chamber as will presently appear.

The rear wall 34 of the furnace has secured therein one end of a boiler 13 which comprises a chamber 49 through which pass a plurality of flues or tubes 51 through which the heated gases from the furnace are adapted to pass for heating water in the container 49.

The boiler 13 may, if desired, be mounted in a casing 52 in the rear end of which is mounted the preheater 14. The preheater 14 comprises the casing 52 having the partitions 20 and 30 in which the ends of flues or tubes 53 are secured. Heated air passing through the boiler 13 from the furnace passes through the tubes 53 and into the exhaust fan or blower 15 which is operated by a motor 54. The exhaust fan 15 exhausts through a conduit 55 into the atmosphere. The preheater 14 has an opening 56 on one side at one end thereof which is closed by an air filter 57. A conduit 58 is attached at the opposite side adjacent the other end thereof for conducting air to the intake of the blower 12 as shown more clearly in Fig. 1 of the drawings. The boiler 13 has a steam space 59 in its upper portion and a conduit 61 is in communication with this space for conducting steam to the main evaporator 16 which is adapted to contain the liquid product that is being concentrated.

The evaporator 16 comprises an upper header 62, a lower header 63, an intermediate casing 40, and tubes 64 extending through said casing and secured in the partition walls 50 and 60 between the headers and casing for connecting the headers together. Steam from the boiler passes along the conduit 61 into the casing 40 and around the tubes of the main evaporator 16 for heating the liquid product contained in the tubes 64 and the lower header 63. The steam imparts its sensible and latent heat to the liquid product which is under a slight vacuum, as will presently appear, and this steam is thereby condensed and the condensate, which in the present instance is water, is returned to the boiler 13 by a tube or passage 65 by gravity. Fresh water may be added to the system through a pipe 70.

In other words, the boiler 13, conduit 61, casing 40 and conduit 65 may be regarded as a closed circuit for one of the heating media. It will thus be seen that after the water has been raised to the boiling point, the steam will carry thermal units to the evaporator where it will give up those units to the liquid product through the walls of the tubes 64 and will be condensed and the water returned through the pipe 65 to the boiler to complete the cycle.

The liquid product is contained in the reservoir 23 and is supplied to the header 63 of the main evaporator by a pipe 79 having a valve 81 therein for controlling the flow of the liquid. The header 62 is in communication with the first liquid collector 17 through a passage 66 which extends into the collector adjacent its upper end. During the operation of the evaporator 16, a violent ebullition of the liquid product will cause steam to carry over particles of liquid into the collector 17 and this liquid will collect in the bottom portion of this collector.

A passage or tube 68 connects the header 63 with the lower header 72 of the auxiliary evaporator 18 and a branch tube 67 connects the collector 17 with the passage 68. The passage 68 supplies liquid to the header 72 but since the violent boiling of the liquid in the evaporator 16 causes considerably more liquid to be carried over to the collector 17 than is required for the header 72, a portion of the liquid in the collector 17 is continuously being returned to the header 63 thus setting up a circulation from the collector 17 through tubes 67, 68, header 63 and back through passage 66. The passage 66 is provided with a baffle 69 which directs the particles of liquid downwardly in the collector.

The steam passing from the evaporator 16 into the collector is utilized for heating the liquid in the auxiliary evaporator 18. This is considered an important feature of the invention since it conserves the heat contained in the vapor or steam generated from the liquid product in the evaporator 16 which in turn was generated by the steam from the boiler, thus conserving the heat originally applied.

The auxiliary evaporator 18 comprises an upper header 71, a lower header 72 and a central or body portion or casing 73 separated from the headers 71 and 72 by suitable partitions 74 and 75 in which are secured the ends of tubes 76 which extend through the casing 73 and connect the headers together. A conduit 77 extends between the upper portion of the collector 17 and the lower portion of the casing 73 of the auxiliary evaporator.

The steam flowing into the casing 73 through the pipe 77 heats the liquid contained in the header 72 and tubes 76 and the steam or vapor from this liquid passes into a second collector 19 where the liquid particles carried over by the steam will be collected in the lower portion of the second collector. This portion is connected to the header 72 through the pipes 82 and 83. The pipes 82 and 83 are connected to the main delivery pipe 84 for conducting the concentrated liquid product to the dehydrator, as will presently appear.

A conduit 85 conducts the steam from the header 71 into the central portion of the second collector 19 and a baffle 86 directs the liquid particles carried by it to the bottom of the collector. The upper end of the second collector is in communication with a condenser 21.

The violent boiling action of the liquid in the evaporator 18 causes large quantities of free particles of the liquid in this evaporator to be carried by the steam over into the collector 19. This liquid collects in the bottom of the collector and since the amount of liquid carried over exceeds the amount required in the dehydrator, a portion of it continuously flows back to the header 72 thus establishing a circulation of the liquid from the collector to the evaporator 18 and back again.

The condenser 21 comprises an upper enlarged chamber 87 having a restricted portion 88 in the form of a tube extending downwardly therefrom. The lower end of the tube extends into an open receptacle 89 which is adapted to contain the water of condensation, the level of which is normally above the lower end of the tube 88 for sealing the same. An overflow pipe 91 above the lower end of the tube 88 permits the water to escape from the receptacle.

The enlarged portion 87 of the condenser 21 contains steam condensing mechanism of any suitable type. As shown, a plurality of ledges 92, arranged in overlapping relation and attached to opposite side walls of the condenser, are employed. These ledges are in the form of shallow containers and the uppermost ledge 92 is supplied with cool water 93 and this water overflows and falls from one ledge to the other thereby condensing the steam passing over from the collector 19 into the condenser through the passage 94. The condensing of this steam creates a partial vacuum in the condenser since the water in the tube 88 constitutes a seal. This in turn relieves the pressure in the collector 19 and auxiliary evaporator. As a result, the liquid product in the auxiliary evaporator is at sub-atmospheric pressure.

In order to prevent the accumulation of air in the condenser and its interference with the operation of the apparatus, a vacuum pump 22 is employed for removing such air.

The lower end of the casing 73 of the auxiliary evaporator is connected to the condenser at the lower end of the enlarged portion 87 by a pipe or tube 95. As the heat in the vapor that passes into the casing 73 is absorbed by the liquid product contained in the tubes 76, the vapor condenses tending to create a partial vacuum whereby the pressure in the evaporator 16, header 62 and casing 73 are sub-atmospheric. The water of condensation is discharged from the casing 73 through the tube 95 attached to the lower portion of the casing 73 and to the enlarged portion of the condenser 87. The column of water in the tube 95 constitutes a seal and the height of the column determines the pressure in the casing 73, collector 17 and header 62 of the main evaporator 16. The pressure in both collectors is sub-atmospheric due to the condensing of steam in the condenser 87 and in the casing 73 and since the header 71 may be said to be in direct communication with the condenser 87 while a column of water in the tube 95 may be said to be interposed between the header 62 and the condenser 87, it follows that the pressure in the header 62 is greater than in the header 71 due to the additional pressure required to overcome the weight of this column of water.

It has been found that the device operates satisfactorily if the vacuum in the header 62 is around twenty inches and that in the header 71 is around twenty-six inches.

In the operation of the device, liquid product from the container 23 is admitted to the main evaporator and is contained in the header 63 and the tubes 64. Steam from the boiler 13 is delivered to the casing 40 between the headers and among the tubes for heating the liquid contained in the tubes and the vapor from this liquid together with liquid particles passes over into the first collector where the liquid is deposited in the bottom of the collector and the steam from the liquid product passes over into the auxiliary evaporator through the passage 77. The steam passing through the conduit 77 is delivered to the casing 73 of the auxiliary evaporator from the header 62 of the main evaporator. The steam or vapor generated from the liquid product in the auxiliary evaporator, together with particles of the liquid, passes into the second collector where the liquid content drops to the bottom and the vapor passes over into the condenser 21 where it is condensed. The vapor passing over from the collector 17 to the casing 73 of the auxiliary evaporator is condensed in the auxiliary evaporator and the condensed liquid is forced through the pipe 95 by the pressure in the collector 17. The height of this pipe determines the pressure of the vapor in the first separator and main evaporator as pointed out above.

It will thus be seen that the liquid, or a portion of it, passing over into the collector 17 may flow back into the header 63 by gravity thereby forming a circuit from the evaporator to the collector and back again for evaporating still further moisture from the liquid product. Likewise, the liquid, of course, is free to flow along the pipe 68 into the header 72 which it does when the pressure in the header 72 is lowered as when liquid is removed for dehydrating. Likewise, the liquid collected in the second collector 19 may be returned to the header 72 to be further evaporated thus establishing another system of circulation. The condensed liquid product passes from the tubes 82, 83 into the main supply pipe 84 where it passes through the pump 24 which delivers it to the distributor 26 of the dehydrator 25.

This distributor comprises an atomizer head 97 having a hollow spindle 90. The atomizer head 97 is adapted to be rotated at a high speed by a suitable motor 98. The head 97 atomizes the condensed liquid product and discharges the same in umbrella form in the interior of the dehydrator 25 as is usual in such constructions.

Suitable means are provided for directing heated air downwardly over the atomizing head 97 and across the periphery of this head. As shown, the air heater 11 has a conduit 101 for conducting the air from the heater to a circular passage or snail 102 surrounding the spindle 90 on the top of the dehydrator. The circular passage or snail 102 causes the air which enters the passage tangentially, Fig. 6, to rotate at high velocity as it is delivered through the pipe 101. Air is supplied to the heater 11 by the fan or blower 12, the intake of which is in communication with the passage 58 which conducts air from the pre-heater 14.

Air from the circular passage or snail passes downwardly through a sleeve 103 into the dehydrator 25. This sleeve extends about the spindle 90 which is protected by a sleeve of insulating material 105 against the heat of the air passing downwardly through the cylinder 103 which would otherwise injuriously affect the liquid product such as milk flowing through the hollow spindle.

A conical shield 106 is mounted above the rotating head 97 for directing the heated air outwardly over the edge of said head and for protecting said head. The head 97 may be rotated in a direction counter to that of the air passing downwardly through the cylinder 103 or it may be rotated in the same direction as said air. Since the details of the atomizer constitute no part of the present invention, the same is shown more or less diagrammatically and a detailed description is deemed unnecessary.

Suitable means are provided for collecting the dehydrated material in the bottom of the dehydrator 25. As shown, the lower end wall of the dehydrator is sloped inwardly as shown at 107 and its inner edge is connected to the upper edge of a trough or channel 108 extending around the lower end of the dehydrator. The upper edge of the inner wall of the channel or trough 108 is connected to the wall of a cone 109 which extends upwardly within the dehydrator 25 axially and is so arranged that material falling on the inclined wall of the cone will be conducted into the trough 108. The wall of the cone 109 extends into the channel or trough 108 so as to form a restricted opening 111 in the upper portion of said trough so that the material is free to slide into the trough but the overhanging edge of the wall of the cone and the side wall 107 will tend to prevent the air delivered in the trough from flowing upwardly into the separator. The channel 108 increases in size from its entrance to its delivery end as shown more clearly in Fig. 3 of the drawings.

The air delivered by the conduit 101 and carrying the dehydrated material with it is exhausted through the passage 108 and conduit 123 into the air separator 27. The air delivered by the conduit 101 is dry, warm air usually in the neighborhood of 500 degrees but in evaporating the moisture contained in the atomized particles of the liquid product, the air becomes more or less saturated and for that reason the dehydrated particles have a tendency to stick to the walls of the channel or trough 108. It has been found that if the velocity of the air in the channel 108 is increased, especially if its temperature be slightly lowered, the material will not collect on the walls of the trough during the operation of the device.

Suitable means are provided for increasing the speed of this air and also for cooling the same. In the form of the device shown, a conduit 112 is provided for this purpose. One end of this conduit is in communication with the small end 113 of the channel 108 and the other end is connected to the pipe 114 leading from the collector 28 to the chamber 46 of the furnace 11. A valve 115 is provided for controlling the amount of air delivered through the conduit 112.

Suitable means are provided for introducing cool air into the pipe 112 and channel 108. As shown, a branch conduit 116 is connected to the conduit 112 and has its other end connected to the discharge side of a fan or blower 117 which is operated by a motor 118. The intake 119 of the fan is provided with an air filter 121 for filtering the air admitted to the system. A valve 122 is provided for controlling the amount of air admitted to the pipe 112 from the fan 117. The enlarged end of the trough or channel 108 is connected to a discharge conduit 123, Figs. 1 and 3, which conducts the air and dehydrated material to the separator 27. The separator 27 is operated by a suitable motor 124 and is of the usual or any well known construction. Since the details of the separator 27 constitute no part of the present invention, the separator is shown more or less diagrammatically.

The material separated from the air passes into the reservoir 29 which is connected with an airtight connection to the discharge side of the separator and from the separator the material may be discharged through a suitable rotary valve 125 operated by a motor 126. The air discharged from the separator 27 will contain more or less of the dehydrated material and for this reason the air containing the material may be passed through a collector 28. A pipe 127 connects the discharge side of the separator 27 to the intake side of the collector 28. The material collected may be discharged from the collector through a rotary valve 128 as is usual in such constructions.

The air, freed from the dehydrated material, is discharged from the collector into the conduit 114 which delivers the air to the furnace for aiding in combustion as has been previously described.

In the operation of the dehydrator, the liquid product is supplied to the head 97 which atomizes the same and the hot air from the furnace 11 is supplied through the conduit 101 for dehydrating the material in the dehydrator 25. The dehydrated material falls to the bottom of the dehydrator and passes with the air into the channel or trough 108 which conducts the same to the evaporator and collector where it is separated from the air and the air delivered to the furnace.

It is thought from the foregoing that the construction and operation of my device will be apparent to those skilled in the art and that changes in size, shape, and proportion may be made without departing from the spirit and scope of the appended claims.

I claim as my invention:

1. In a dehydrating apparatus, a furnace for generating heated gases, a combined boiler and air preheater, an air heater, means for passing said heated gases in series through said air heater, boiler and preheater in the order named, an evaporator for containing a liquid product to be evaporated, a conduit forming a closed circuit with said evaporator and boiler for circulating steam generated in said boiler through said evaporator, a dehydrator, means for conducting the concentrate from said evaporator to said dehydrator, means in said dehydrator for atomizing said concentrate, and means for causing air to flow through said preheater and air heater into said dehydrator for dehydrating the atomized material, and means for returning a portion of said air to said furnace for assisting in combustion.

2. In a system for dehydrating liquid products, a primary evaporator for containing a liquid product, a secondary evaporator for receiving the concentrate from said first-named evaporator, means for evaporating moisture from the liquid in said primary evaporator, said means comprising a boiler for heating a fluid and conduits for conducting said fluid to said primary evaporator and back to said boiler for heating said evaporator, means for utilizing the steam generated in said primary evaporator for evaporating moisture from the concentrate in said secondary evaporator, a furnace, an air heater, a preheater, means for causing heated gases from said furnace to flow through said air heater, said boiler and preheater in the order named, a dehydrator, means for spraying said product in said dehydrator, means for conducting fresh air through said preheater and air heater into said dehydrator for dehydrating said product sprayed therein, and a conduit for discharging the gases passing through said furnace, air heater, boiler and preheater into the atmosphere.

3. In a system for desiccating a liquid product, an evaporator, a dehydrator, a liquid product reservoir, means for conducting said product to said evaporator for condensing the same, means for conducting the concentrate from said evaporator and for spraying the same into said dehydrator, a furnace, an air heater, a boiler, a preheater adjacent to said boiler, means for causing heated gases from said furnace to flow through said air heater, then through said boiler and finally through said preheater for heating the air heater, boiler and preheater, means for recirculating a fluid through said boiler and evaporator, and means for conducting fresh air first through said preheater, then said air heater and finally delivering the same into said dehydrator for desiccating said product.

4. In a system for dehydrating a liquid product, an air heater, a furnace, a preheater, a boiler, means for causing combustion gases from said furnace to pass through said air heater, boiler and preheater in said order and for discharging the same from said system, an evaporator, means for conducting an aqueous fluid from said boiler to said evaporator in a closed circuit for concentrating said product, a dehydrator chamber, means for discharging the concentrated product into said dehydrator chamber in finely divided particles, means including a fan for causing air to flow through said preheater, through said heater and into contact with said particles for dehydrating the same, a circular channel in the lower portion of said dehydrator chamber for receiving the dehydrated particles of said product, an air separator, means for conducting the mixture of the dried particles and said air to said separator for separating the dried particles from the air, means for directing a blast of fresh air into said channel for increasing the velocity of the mixture of air and particles and for cooling said particles, and means for conducting a portion of the air from said separator to said channel and the remainder to said furnace.

JOSEPH M. HALL.